UNITED STATES PATENT OFFICE 2,539,704

TREATMENT OF HYDROXYLATED POLYMERS

Dwight L. Schoene and Victor S. Chambers, Naugatuck, Conn., assignors to United States Rubber Company, New York, N. Y., a corporation of New Jersey No Drawing. Application July 7, 1948, Serial No. 37,508

7 Claims. (Cl. 260—231)

This invention is concerned with the base catalyzed reaction of mono vinyl sulfones of the formula $CH_2=CH\ SO_2\ R$, where R is any organic radical, with hydroxylated polymers such as starch, dextrins, cellulose, regenerated cellulose, and the like. By means of this reaction, a number of new products can be prepared which possess useful and novel properties.

The reaction may be postulated as follows:

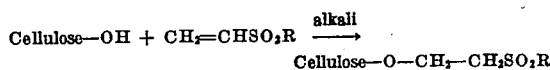

where cellulose—OH is a portion of the cellulose chain. Similar reactions take place with other hydroxyl groups along the cellulose chain to give a product appreciably altered from the starting material in physical and chemical properties.

Cellulose is considered to be a polymer made up of anhydro glucose units each containing three hydroxyl groups. All of these hydroxyls may be reacted by our process but for practical purposes it usually suffices to stop the reaction at less than complete etherification.

The conditions for carrying out this invention are relatively simple. The hydroxylated polymer is moistened with aqueous alkali and then treated with the mono vinyl sulfone as such or dissolved in a solvent. The reaction will take place at room temperature with evolution of heat, although in some cases it is desirable to heat the mixture to accelerate the process. Alternatively, the polymer may be treated first with the sulfone and then with alkali, or the sulfone and catalyst may be pre-mixed and reacted with the polymer. The reaction may be stopped at any time by washing out the catalyst or by neutralization with acid.

In order to control the heat of reaction, it is usually most convenient to use a solution of the sulfone. Water is the preferred solvent for the sulfone, allowing the sulfone to react by preference with the cellulosic hydroxyls rather than with the water. Other suitable inert solvents include ether, dioxane, benzene, and chloroform.

As catalysts, we may employ any base or alkali which is unreactive with mono vinyl sulfone, and which has a basic strength at least equivalent to sodium acetate. In general, the stronger the base, the more rapid the reaction. The inorganic alkali hydroxides such as sodium and potassium hydroxides are preferred because of their effectiveness and low cost. Sodium and potassium carbonates are also effective catalysts as are the alkali earth hydroxides. Among the organic bases, the quaternary ammonium hydroxides such as benzyl trimethyl ammonium hydroxide and tetraethyl ammonium hydroxide, are very effective. Tertiary amines such as trimethyl amine and triethyl amine will effect the reaction but are appreciably slower than the stronger alkalis. The concentration of catalyst may be as low as 0.1% of the weight of the cellulose although the reaction rate increases with an increase in catalyst concentration. There is no known upper limit on the amount of catalyst which may be employed.

The vinyl sulfones which are operative in this process include the alkyl vinyl sulfones such as methyl vinyl sulfone, ethyl vinyl sulfone, n-butyl vinyl sulfone, isobutyl vinyl sulfone, octyl vinyl sulfone, n-dodecyl vinyl sulfone, 2-dodecyl vinyl sulfone, 2-tetradecyl vinyl sulfone, t-octadecyl vinyl sulfone, n-octadecyl vinyl sulfone, and the like, as well as alkaryl sulfones such as benzyl vinyl sulfone, phenethyl vinyl sulfone and related materials. Suitable aryl vinyl sulfones include phenyl vinyl sulfone, o, m, or p-tolyl vinyl sulfone, o, m, or p-chlorophenyl vinyl sulfone, p-nitrophenyl vinyl sulfone, alpha, and beta-naphthyl vinyl sulfone, and the like. Beta-haloethyl sulfones which give mono vinyl sulfones in the presence of alkali are also within the scope of our invention. The mono vinyl sulfonyl group is the reactive part of the molecule and the other substituent group may be any organic radical which is stable to alkali and which does not contain hydrogen atoms more reactive in this process than the cellulosic hydroxyls.

The products of the invention, depending upon the starting materials employed, are useful for a number of applications. Cellulose or rayon (regenerated cellulose) reacted to a low degree of etherification with methyl vinyl sulfone, i. e., containing about 0.1 to 0.5 beta-(methyl sulfonyl) ethyl groups per anhydroglucose unit, swells very appreciably in water but does not completely dissolve. Such products can find application in toweling or in adsorbent bandages. With the reaction of about one methyl vinyl sulfone per anhydroglucose unit, the cellulosic material becomes more or less completely soluble in water or dilute alkali, from which solution it can be regenerated in the form of filaments or films which can find application as textile sizing agents, textiles, and as plastics. Higher degrees of substitution, particularly with mono vinyl sulfones having larger substituent groups, e. g., isobutyl, lead to loss of water solubility and the products become soluble in or plasticized by organic solvents. Such products also can find application in the plastics industry.

A feature of the invention is the preparation of a starch derivative which is completely soluble or dispersible in cold water to form viscous solutions and which can find application as a textile sizing agent. This product is obtained from the reaction of starch with approximately an equal weight of methyl vinyl sulfone.

Another feature of the invention is the preparation of water repellent cellulosic fabrics. This is accomplished through the use of long chain alkyl vinyl sulfones, preferably containing about 12 to 18 carbon atoms in the alkyl chain. For reasons of economy we prefer to use relatively low concentrations of the sulfone (in the order of 1 to 10% by weight based on the cellulose), although higher concentrations are permissible.

The reaction is carried out by the same general procedure as described above. For example, the fabric is treated with a solution of the sulfone in an organic solvent or with a suspension or emulsion in water and the solvent allowed to evaporate. The fabric is then moistened with a solution of the catalyst, preferably in the presence of a wetting agent. The reaction is completed by heating to 50–150° C. for a period of several hours, with or without concurrent evaporation of the water. The catalyst and unreacted sulfone are removed by washing, leaving the fabric water-repellent and the repellency will remain through repeated launderings or dry cleanings.

The order of the treatment may be reversed, if desired, or the alkali catalyst can be added to an aqueous emulsion or suspension of the sulfone just before treatment of the fabric. Although the reaction will proceed at room temperature, best results are obtained by heating to the melting point of the long chain sulfone thus permitting it to permeate through the fabric and give more uniform reaction.

The following examples illustrate the invention, parts being by weight.

Example 1

One part of laundry starch dispersed in 10 parts of hot water is treated with 2 parts of methyl vinyl sulfone, followed by 2 parts of a 4% solution of benzyl trimethyl ammonium hydroxide. The mixture is warmed on a steam bath for one and a half hours and becomes slightly more viscous than a control sample treated the same way, except that the sulfone is omitted. Both samples are stirred into 50 parts of ethanol. The methyl vinyl sulfone sample precipitates as a sticky mass while the control comes down as a fine, non-tacky solid. After washing with alcohol the sulfone treated sample is dried for 48 hours at 70° C. giving 2.17 parts of a hard, slightly brittle product. Analysis gives 11.37% sulfur which corresponds to approximately 1 combined methyl vinyl sulfone molecule per anhydroglucose unit. The product is readily plasticized by water giving a flexible, translucent film which slowly dissolves to a viscous solution.

Example 2

One part of soluble starch dissolved in 10 parts of warm water is treated with 1.5 parts of methyl vinyl sulfone and 1 part of a 3% solution of benzyl trimethyl ammonium hydroxide. The solution becomes pale yellow. It is heated for 20 minutes on a steam bath and is coagulated by pouring into 50 parts of ethanol. Addition of 1 part of formic acid destroys the yellow color of the gummy, sticky precipitate. The product is soaked in fresh ethanol which reduces the tackiness. It is then pressed into thin films and dried. A control sample which does not receive the sulfone treatment precipitates as a granular, non-tacky solid.

Example 3

Ten parts of laundry starch are treated with a solution containing 5 parts of methyl vinyl sulfone and 5 parts of cold water. The resulting slurry is stirred with 5 parts of a 1% sodium hydroxide solution in water and allowed to stand. After 15 minutes the temperature has increased to about 40° C. and the mixture has become a solid translucent mass. A control sample containing no sulfone is not visibly affected by the alkali during the 15 minute period.

Example 4

The end of a strip of filter paper is dipped into methyl vinyl sulfone and then into 10% aqueous sodium hydroxide solution. Within a few minutes the sulfone treated portion swells to about five times its original thickness, indicating reaction, while the untreated filter paper swells only slightly.

Example 5

One part of filter paper is treated with 2 parts of methyl vinyl sulfone and then with 5 parts of 20% sodium hydroxide solution. The mix becomes warm and the paper is converted on stirring to a swollen, crumbly mass. After heating to 50° C. for 15 minutes the mixture is acidified with acetic acid and filtered. Only a few of the original fibres are visible in the product which is insoluble in cold water but which dissolves partially in warm formamide to a viscous, hazy solution.

The bulk of the swollen material is treated with 2 parts of methyl vinyl sulfone followed by 10 parts of 10% sodium hydroxide and warmed to about 80° C. over a period of about 15 minutes, which results in an optically clear, very viscous solution. The mixture is acidified and poured into methanol yielding an off-white solid which is pressed to a clear, translucent film. After drying for 40 hours at 80–90° C., 3 parts of dry product are obtained which swell but do not completely dissolve in water. This corresponds to substantially complete conversion of the cellulosic hydroxyls to (methyl sulfonyl)-ethyl ether groups.

Example 6

A 24 x 10 inch piece of a commercial viscose rayon fabric weighing 20 g. is dipped into a freshly prepared aqueous solution containing 10% methyl vinyl sulfone and 0.5% sodium hydroxide. The excess solution is immediately squeezed out giving a wet pick-up of 31 g. The fabric is folded once and heated between two glass plates at 55° C. for 2 hours. The fabric is then washed and dried. Pressing with a hot iron removes the crease formed by the fold but it reappears when the fabric is moistened. A control sample treated in the same manner, except that the sulfone is omitted, does not show the permanent wet crease. The treated sample is also appreciably more absorbent than the control when placed in water.

Similar results are obtained when the sodium hydroxide is replaced by 1% sodium carbonate or by 1% benzyl trimethyl ammonium hydroxide.

Example 7

A sample of raw viscose rayon yarn totalling 1.62 parts is treated with 12 parts of methyl vinyl sulfone and after 1 minute 20 parts of 20% sodium hydroxide in water are added. Within 1 to 2 minutes the rayon dissolves and heat is evolved. A few minutes later the product begins to separate from the viscous solution. After an hour the mixture is stirred into several volumes of ethanol containing sufficient acetic acid to neutralize the alkali. The solid product is washed with ethanol and dried. It analyzes 18.62% sulfur which corresponds to approximately 2.5 combined methyl vinyl sulfone groups per anhydroglucose unit.

Example 8

One and one-tenth parts of filter paper are immersed momentarily in a 20% sodium hydroxide solution and then blotted to remove excess solution. It is cut into small pieces and placed in a solution of 3 parts of ethyl vinyl sulfone in 10 parts of benzene. Over a period of 15 minutes the paper becomes 2 to 3 times thicker and contracts in both length and width. The mixture is heated to about 50° C. for a few minutes and allowed to stand overnight at room temperature. Some additional swelling occurs during this time. The benzene solution is removed and replaced by 3 parts of acetic acid in 17 parts of methanol. The paper is then washed with water which causes some loss due to solution and again with methanol. After drying at 55° C., 2.25 parts of a hard white solid are obtained which analyzes 14.0% sulfur. This corresponds to approximately 1.5 combined ethyl vinyl sulfone groups per anhydroglucose unit.

The product becomes flexible in water but does not swell appreciably, is swelled by formamide giving a translucent film and dissolves in bis-(beta-hydroxyethyl)-sulfone leaving a few portions of unswollen material.

Example 9

Three parts of absorbent cotton are soaked for 5 minutes in 20% sodium hydroxide solution and pressed out giving a three-fold weight increase. It is then treated with 3 parts ethyl vinyl sulfone in 55 parts of benzene. After 30 minutes the solution is decanted off and replaced with a fresh one. Fifteen minutes later this is repeated and the mix allowed to stand overnight. The cotton swells slightly and becomes translucent. It is washed with 10% acetic acid in methanol and by methanol and dried, giving 6.1 parts of final product which is similar in appearance to the starting material but somewhat harder. It is thus possible to effect the reaction without destroying the fibrous nature of the cotton.

Example 10

A viscose solution is prepared from 10 parts of cotton, 4 parts of carbon disulfide (combined) and sufficient 10% sodium hydroxide to give a final concentration of 8% based on the original cellulose.

Ten parts of this viscose solution is treated with 1 part of ethyl vinyl sulfone. The solution becomes opaque and semi-jelled. After 10 minutes it is spread out to a film and flushed with a saturated magnesium sulfate solution, followed by 50% sulfuric acid, water, and methanol in that order. The film shrinks slightly during this coagulation treatment and part of it dissolves during the water wash. After drying at 55° C. the sulfur content is 17.3%. The resinous product thus is a regenerated cellulose containing slightly more than 2 parts combined ethyl vinyl sulfone per anhydroglucose unit.

When a sample of the untreated viscose solution is coagulated by the same treatment, it shrinks markedly and is converted to a substantially sulfur-free product.

Example 11

One and one-half parts of raw viscose rayon yarn are soaked for 5 minutes in 5% sodium hydroxide solution and pressed between adsorbent paper to remove excess alkali. It is then mixed with 6 parts of isobutyl vinyl sulfone. Heat is evolved and the rayon disintegrates. After an hour at 80° C. the mixture is a translucent, jelly-like mass containing only a few visible fibres. The mixture is neutralized with acetic acid and treated with 20 parts of chloroform which gives a viscous solution from which the (isobutyl sulfonyl)-ethyl cellulose is recovered as a film by evaporation of the solvent.

Example 12

Two parts of the viscose solution of Example 8 are treated with 1 part of crystalline phenethyl vinyl sulfone and the mixture is heated to 70° C. to melt the sulfone. On stirring reaction occurs and the solution gels while an untreated control does not gel under similar treatment. The gel is stirred with an excess of dilute acetic acid which converts it into a white solid resin which is insoluble in water and acetone but dissolves to a viscous solution in bis-(beta-hydroxyethyl)-sulfone. This demonstrates that an aryl substituted alkyl vinyl sulfone reacts with a cellulose derivative in the same manner as the unsubstituted alkyl vinyl sulfones.

Example 13

A strip of filter paper is dipped into a 10% solution of p-tolyl vinyl sulfone in benzene and then placed in a 20% solution of sodium hydroxide. The paper shrinks in width and becomes opaque over a period of 5 minutes, while a control sample is little affected by the alkali. This difference in appearance persists after the paper is washed with dilute acetic acid, water and benzene.

Example 14

Cotton duck is scoured with hot water and soap and is steeped in 2% aqueous NaOH for one-half hour at about 25° C. Most of the aqueous alkali is removed by blotting on paper and squeezing between cloth towels. It is then soaked for about 10 minutes in a benzene solution containing approximately 0.08 g. of dodecyl vinyl sulfone per cubic centimeter of solution. After removing from benzene solution it is heated in an oven at 55° C. for about 15 hours. The cloth is then washed with benzene, dilute acetic acid and water, and dried. It is then resistant to water, as is shown by the following tests.

1. Water sprinkled on the surface of the treated cloth remains as drops until it evaporates and does not soak into the fibres. On untreated cloth the water immediately soaks in and produces wet spots.

2. A piece of treated cloth is placed in water and it fails to absorb the water and sink as does an untreated piece. Water can be made to penetrate between the threads by rubbing the cloth while it is immersed, but the threads or fibres do not swell and soak up the water.

3. A piece of the treated cloth is weighed, immersed in water, blotted between paper blotters and reweighed. It takes up water equal to 27% of its weight, while the untreated cloth takes up 72%.

*Example 15*

Viscose rayon yarn (regenerated cellulose) is immersed in 2% aqueous sodium hydroxide for 4 minutes, blotted semi-dry between towels and soaked in a 10% solution of dodecyl vinyl sulfone in benzene for 10 minutes. It is then heated in an oven at 55° C. for 15 hours and washed in benzene, dilute acetic acid, and water, and then dried. The treated yarn does not wet easily and floats indefinitely on water. The untreated yarn soaks up water very rapidly and quickly sinks. The appearance and feel of the treated yarn is the same as that of the untreated yarn.

*Example 16*

A rainwear twill with bright viscose rayon face and cotton filling is scoured with soap and water, dried and immersed in a benzene solution of n-octa decyl vinyl sulfone for a few minutes and then air dried. The fabric thus impregnated with the sulfone is steeped for one-half hour at room temperature in a 5% aqueous sodium hydroxide solution that is saturated with a wetting agent such as di-isopropyl naphthalene sodium sulfonate (Aerosol OS). The excess caustic is allowed to drain for a few minutes and the fabric is heated in an oven at 50–60° C. for 15 to 20 hours. It is then washed, taking care that the Aerosol is completely removed. The water resistance of this treated cloth is then very much greater than the untreated piece.

*Example 17*

A sheet of filter paper is immersed in a 5% aqueous solution of sodium hydroxide for 3–5 minutes at room temperature. The excess alkali is removed by blotting on towels and the alkali treated paper is soaked in a 5–10% solution of dodecyl vinyl sulfone for 15 minutes at room temperature and is then heated in an oven at 55–60° C. for 15 hours. After washing, as described in previous examples and drying, it possesses excellent water resistance.

*Example 18*

A cotton sheeting is impregnated with a water suspension of octadecyl vinyl sulfone which is made by grinding octadecyl vinyl sulfone in a ball mill 15 hours with 10–20 times its weight of water containing 0.5% of di-isopropyl naphthalene sodium sulfonate. The wet fabric with the particles of octadecyl vinyl sulfone adhering to it is dried and heated at 80–90° C. for about one-half an hour. It is then immersed in an aqueous solution containing 5% sodium hydroxide for about 30 minutes at room temperature. After removing the excess caustic solution so that the fabric has a wet pick-up of about 125% to 150%, it is heated at 50–60° C. for 2 hours in a closed container so that it does not become completely dry. After washing, as described in previous examples and drying, it possesses excellent water resistance.

*Example 19*

A piece of tightly woven cotton fabric is immersed in 20% sodium hydroxide solution and is pressed between absorbent papers to remove excess solution. It is then covered with a 1% solution of beta-bromoethyl dodecyl sulfone and allowed to stand overnight at room temperature (ca. 25° C.). The benzene evaporates leaving a mixture of crystals of the starting material and dodecyl vinyl sulfone. The fabric is washed well with benzene, water and acetone and dried. It then possesses marked water repellency. It floats for a period of 6 hours on a dilute solution of ink and the ink stains only scattered portions of the fabric. An untreated control is stained immediately by the ink solution.

Having thus described our invention, what we claim and desire to protect by Letters Patent is:

1. A method which comprises subjecting a polysaccharide, selected from the class consisting of starch and cellulose, to chemical reaction with a mono vinyl sulfone of the formula $CH_2=CHSO_2R$, where R is alkyl hydrocarbon having from 1 to 4 carbon atoms.

2. A method which comprises subjecting a polysaccharide selected from the class consisting of starch and cellulose to etherification by chemical reaction with a monovinyl sulfone of the formula $CH_2=CHSO_2R$, where R is alkyl having from 1 to 4 carbon atoms.

3. A method which comprises subjecting a polysaccharide selected from the class consisting of starch and cellulose to etherification by chemical reaction with a monovinyl sulfone of the formula $CH_2=CHSO_2R$, where R is alkyl having from 1 to 4 carbon atoms in the presence of a basic catalyst.

4. A method which comprises subjecting cellulose to etherification by chemical reaction with a monovinyl sulfone of the formula $$CH_2=CHSO_2R$$

where R is alkyl having from 1 to 4 carbon atoms.

5. A method which comprises subjecting cellulose to etherification by chemical reaction with a monovinyl sulfone of the formula $$CH_2=CHSO_2R$$

where R is alkyl having from 1 to 4 carbon atoms in the presence of a basic catalyst.

6. A method which comprises subjecting starch to etherification by chemical reaction with a monovinyl sulfone of the formula $CH_2=CHSO_2R$, where R is alkyl having from 1 to 4 carbon atoms.

7. A method which comprises subjecting starch to etherification by chemical reaction with a monovinyl sulfone of the formula $CH_2=CHSO_2R$, where R is alkyl having from 1 to 4 carbon atoms in the presence of a basic catalyst.

DWIGHT L. SCHOENE.
VICTOR S. CHAMBERS.

REFERENCES CITED

The following references are of record in the file of this patent:

UNITED STATES PATENTS

| Number | Name | Date |
|---|---|---|
| 2,069,774 | Reid | Feb. 9, 1937 |
| 2,103,879 | Ufer | Dec. 28, 1937 |
| 2,422,000 | Dickey et al. | June 10, 1947 |
| 2,427,640 | Whitehill et al. | Sept. 16, 1947 |